No. 786,111. Patented March 28, 1905.

UNITED STATES PATENT OFFICE.

BARTH GOLLWITZER, OF ANTWERP, BELGIUM.

ALIMENTARY COMPOSITION.

SPECIFICATION forming part of Letters Patent No. 786,111, dated March 28, 1905.

Application filed September 22, 1904. Serial No. 225,398.

*To all whom it may concern:*

Be it known that I, BARTH GOLLWITZER, a citizen of the Empire of Germany, residing in Antwerp, in the Kingdom of Belgium, have invented certain new and useful Improvements in Alimentary Compositions, of which the following is a specification.

This invention relates to an improved alimentary composition which is easily digestible and which is of special utility for improving the blood and strengthening the nerves, owing to its contents of iron, albumen, and calcium phosphate, said composition being supplied in the form of a paste and baked into cake or zwieback; and the invention consists of an alimentary composition containing a condensed mixture of cow's milk, pig's blood, spinach, butter, sugar, and calcium phosphate.

The composition is advantageously mixed in the following proportions: one-half a liter of cow's milk with the cream contained therein, one-half a liter of fresh pig's blood, one kilogram of boiled and finely-chopped spinach, one hundred and fifty grams of butter, one hundred and fifty grams of sugar, fifty grams of calcium-phosphate. The ingredients are mixed together with salt and other seasoning into an easily-flowing mass and then evaporated until a paste mass is obtained, which is placed in glass jars, tin cans, or other hermetically-sealed vessels. When using said paste, a dough made of flour, to which a sufficient quantity of baking-powder has been added, is mixed therewith in the proportion of one to four, which mixture is then rolled out to the thickness of a quarter of an inch, cut into oblong cakes, baked in the oven, and subsequently dried, forming cakes of greenish-brown color, which are served with the meals or with coffee, chocolate, or otherwise.

In place of baking-powder the dough can be made with yeast and baked, cut into slices, and dried in the nature of zwieback. In either form the composition forms an easily-digestible product, which, owing to its contents of iron and albumen in organic form and calcium phosphate, is of special use for improving the blood by the introduction of iron and for strengthening the brain and nerves. The iron contained in the spinach is introduced into the system in an easily-digestible form, the cakes or zwieback made from the composition owing to their attractive taste being specially useful as a food for children, invalids, and all those who require improvement in the condition of their blood and in the strengthening of their nerves.

Having thus described my invention, I claim as new and desire to secure by Letters Patent—

1. An alimentary composition, containing a mixture of cow's milk, pig's blood, spinach, butter, sugar and calcium phosphate.

2. A cake or zwieback made from an alimentary composition containing a mixture of cow's milk, pig's blood, boiled and finely-chopped spinach, butter, sugar, calcium phosphate, a suitable seasoning, and flour.

In testimony that I claim the foregoing as my invention I have signed my name in presence of two subscribing witnesses.

BARTH GOLLWITZER.

Witnesses:
   PAUL GOEPEL,
   HENRY J. SUHRBIER.